United States Patent [19]

Brotz

[11] Patent Number: 5,398,278
[45] Date of Patent: Mar. 14, 1995

[54] DIGITAL MUSICIANS TELEPHONE INTERFACE

[76] Inventor: Gregory R. Brotz, P.O. Box 1322, Sheboygan, Wis. 53081

[21] Appl. No.: 76,420

[22] Filed: Jun. 14, 1993

[51] Int. Cl.⁶ .......................................... H04M 11/00
[52] U.S. Cl. ....................................... 379/90; 379/389; 379/390; 379/85; 379/81; 381/118; 84/645
[58] Field of Search ................... 381/77, 80, 82, 118; 379/90, 93, 97–99, 101, 344, 345, 387–390, 395, 442; 84/671, 645; 370/85.1

[56] References Cited

U.S. PATENT DOCUMENTS

| | | | |
|---|---|---|---|
| 4,124,773 | 11/1978 | Elkins | 379/101 |
| 4,587,514 | 5/1986 | Schas et al. | 370/85.1 |
| 4,922,536 | 5/1990 | Hoque | 381/80 |
| 5,020,101 | 5/1986 | Brotz et al. | 379/389 |
| 5,182,768 | 1/1993 | Nakano et al. | 379/387 |

OTHER PUBLICATIONS

J. L. Fike et al, "Understanding Telephone Electronics", 1984, pp. 248–254.

Primary Examiner—Wing F. Chan
Attorney, Agent, or Firm—William Nitkin

[57] ABSTRACT

A telephone interface system to interconnect the output of two or more musicians, one at an instant location and the other at a remote location, over communication lines such system converting the analog musical output to digital form for duplexing over the communication lines.

5 Claims, 5 Drawing Sheets

DIGITAL MUSICIANS TELEPHONE INTERFACE

BACKGROUND OF THE INVENTION

Field of the Invention

The device of this invention resides in the area of telephone communication circuitry and more particularly relates to a telephone system for transmitting music produced at a first instant location to a second remote location and vice versa where musicians and/or vocalists at each location interact and collaborate with one another by hearing actual combined real-time audio sound of the music produced at both locations and can practice together and, if desired, hear the remote location sound louder than the sound at the instant location.

Description of the Prior Art

The Applicant with co-inventor Angelo N. Dallas obtained U.S. Pat. No. 5,020,101 for a Musicians Telephone Interface which discloses an analog system for combining music played at both a remote and an instant location at virtually the same time to simultaneously broadcast the sound at each location as if the music were being played together at one location so that musicians at each location can collaborate with one another over the telephone line. Problems, though, occur as real-time analog telephone systems do not necessarily carry full analog bandwidth signals and often will cut off the high and low frequencies of such signals or otherwise degrade the sound quality when the remote location signal is amplified.

SUMMARY OF THE INVENTION

It is an object of this invention to provide an improved musicians telephone interface which operates by a digital system and does not rely on an analog interface.

While high-fidelity sound falls in the range of 30–20,000 Hz, voice transmission telephone lines will not carry such high-fidelity sound as they are limited in range to 300–4,000 Hz while telephone receivers are limited even further to 500–2,500 Hz. Thus it is a further object of this invention to avoid the use of telephone receivers and speaker telephones and to provide a digital system that will allow the transmission of the maximum frequency bandwidth sounds to provide the highest fidelity possible of amplified music at both a remote and an instant location.

DESCRIPTION OF THE PREFERRED EMBODIMENT(S)

Figure 1:
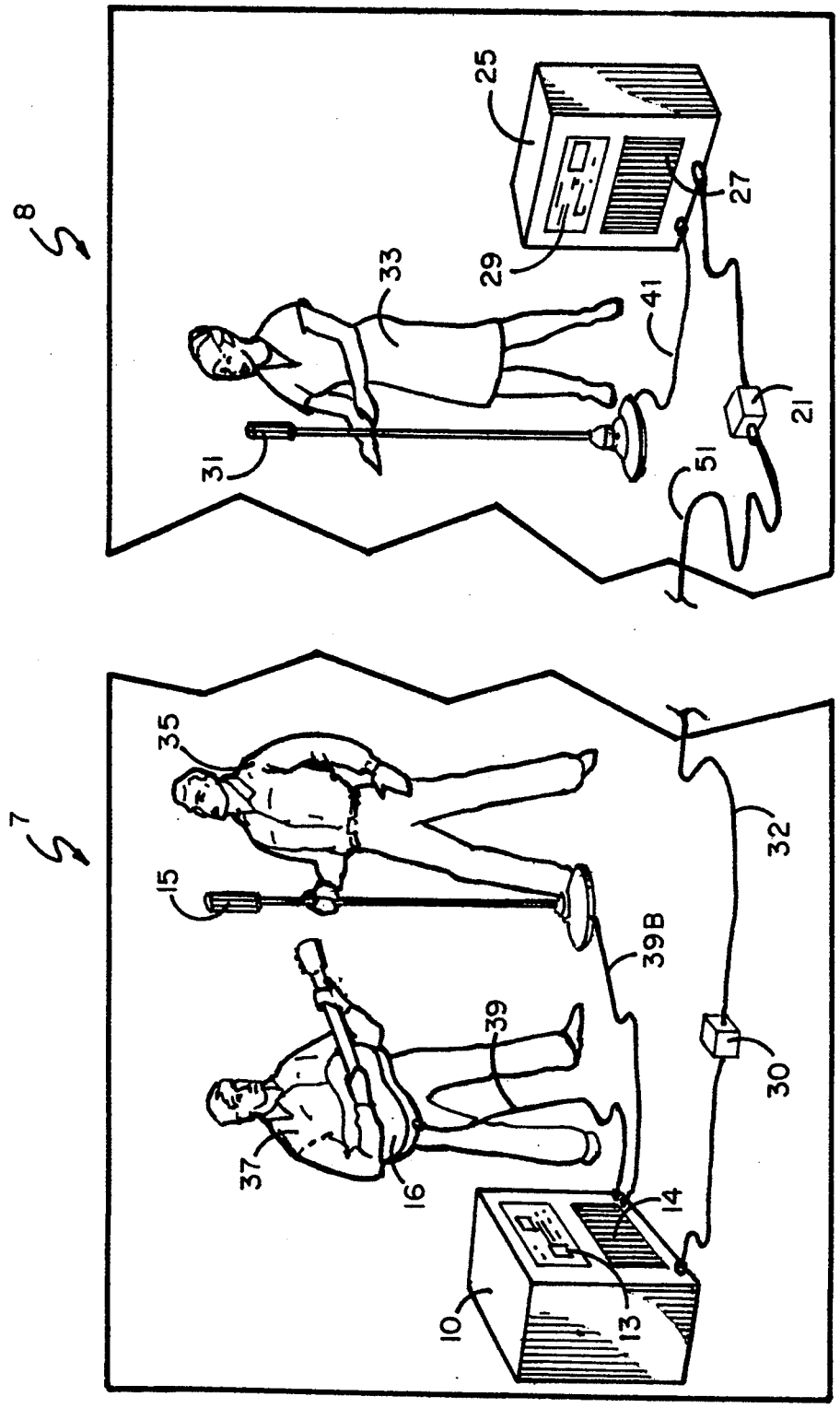
FIG. 1 illustrates a view of a remote location and an instant location with musicians and singers engaged in musical collaboration.

FIG. 1 illustrates a view of two separated locations, being instant location 7 and remote location 8 which locations can be physically separated from one another by a great distance as long as instant location 7 and remote location 8 can be interconnected by a telephone line or other type of transmission medium such as a coaxial cable. At instant location 7 is guitar player 37 playing guitar 16 which is interconnected by electrical line 39 to control unit 10. Also at this location is singer 35 singing into microphone 15 which is also interconnected by electrical line 39b to control unit 10. Control unit 10, in addition to having the musicians telephone interface circuitry, also includes dual volume controls 13 and 13a and speaker 14 as will be described further below. Control unit 10 is interconnected to telephone circuitry 30 which is connected to remote location 8 by telephone line 32. Telephone line 32 is part of the telephone system and is interconnected to telephone line 51 at remote location 8 which passes the transmitted signal through telephone circuitry 21 to control unit 25. Control unit 25 at remote location 8 is identical to control unit 10 at instant location 7. At remote location 8 singer 33 sings into microphone 31 which is interconnected by line 41 to control unit 25. Control unit 25 also has volume controls 29 and 29b. In practice, for collaboration between singer 33 at remote location 8 and singer 35 and guitar player 37 at instant location 7, the system of this invention allows such singers and musicians at each location not only to hear themselves but also to hear the singing and/or music of the musicians at the other location at the volume they would be heard if all musicians and/or singers were present at the same location. Guitar player 37 and singer 35 at instant location 7 by adjusting volume control 13a can adjust the volume of the singing of singer 33 from remote location 8 to sound as loud as, or louder than, their own singing at instant location 7 to allow for musical collaboration which is especially helpful in the creation of songs and music. In the same way, singer 33 at remote location 8 can, by adjusting volume control 29a, hear the guitar playing and singing respectively of the musician and singer at instant location 7 at the same time that singer 33 is also singing along and hearing her own voice amplified over the same speaker with the voice volume of singer 33 controlled by volume control 29. This ability of one group of musicians/singers at an instant location to hear singers and/or musicians at a remote location allows for collaboration without the need for the parties and equipment to travel to the same location. My invention herein allows a plurality of musicians to collaborate easily despite the distances apart of their individual locations.

Figure 2:
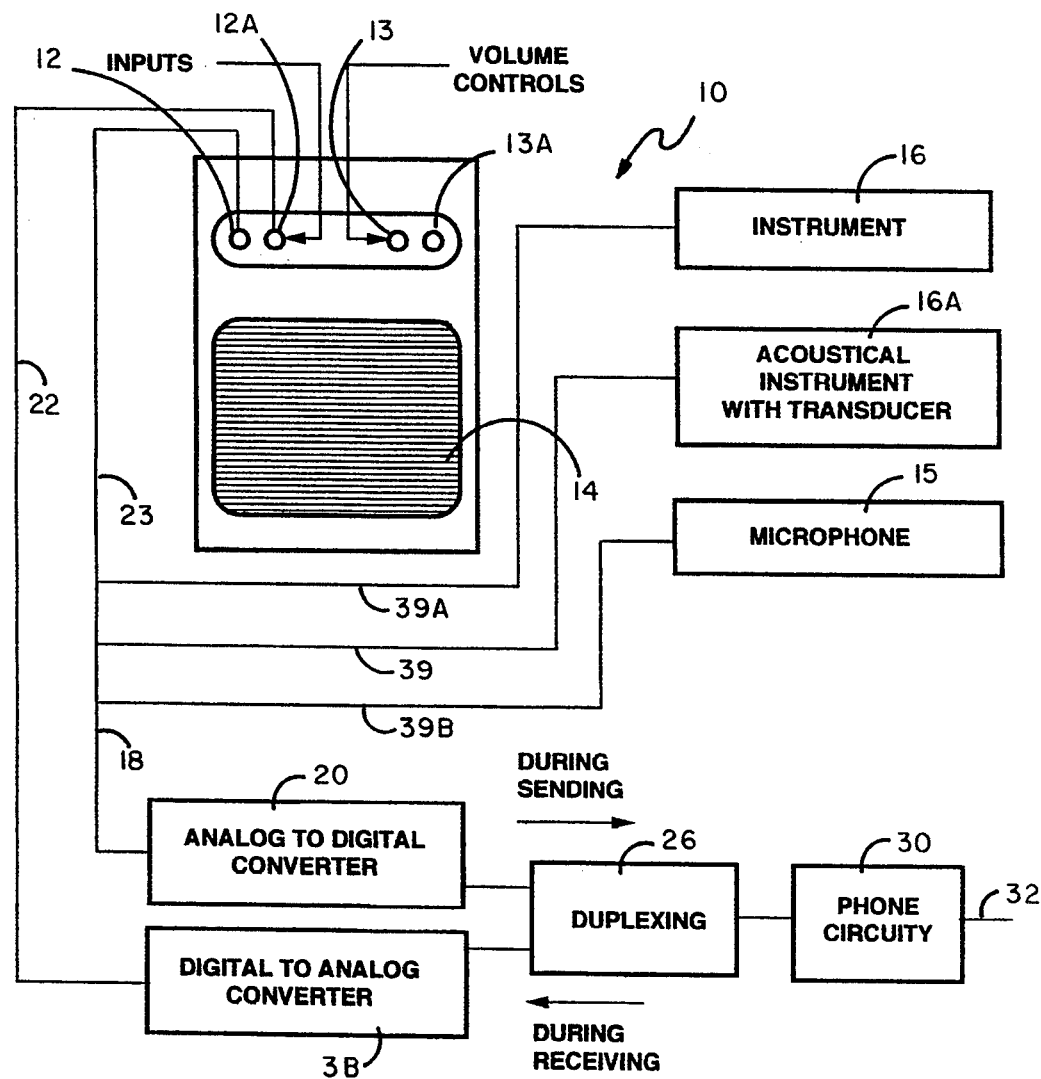
FIG. 2 illustrates a schematic diagram of a first instant location's duplexing digital system for the musicians telephone interface of this invention.

Seen in FIG. 2 is control unit 10 which contains therein an amplifier directing a signal received to speaker 14 along with volume controls 13 and 13a and a pair of signal input jacks 12 and 12a which direct first and second signal inputs to amplifier/speaker 14. Volume controls 13 and 13a each independently control the volume from signal inputs 12 and 12a, respectively. Line 23 extending into signal input 12 receives the music occurring at the instant location such as from microphone 15, instrument 16 and/or from a transducer mounted on an acoustical instrument 16a over lines 39, 39a and 39b. Volume control 13 will control the volume at which the music from the instant location is amplified through amplifier/speaker 14, and volume control 13a controls the volume of the music played by speaker 14 from the remote location. Signal input 12a receives line 22 which carries the musical signal from the remote location as described further below. The musical collaborators at each location can adjust the volume of their own music and the music from the other location. Since electrical signals travel almost instantaneously, there is no appreciable sound delay, and the musicians can communicate and musically collaborate in real time. Line 23, which receives the musical signals from the instruments and the microphone at the first instant location, extends to line 18 which also directs such signal to an analog-to-digital converter 20 which then converts the music's analog signal to a digital signal and sends this signal through duplexer 26 and then through telephone crcuitry 30 along telephone line 32 to the second remote location. The duplexer can assign each musician/singer his own respective communication channel as the signals are duplexed over the transmission medium from one location to the other. A digital signal is received from the remote location on the same telephone line 32 which signal is directed through telephone circuitry 30 and to duplexer 26 which eliminates the outgoing signal and directs the incoming digital signal to digital-to-analog converter 38. Digital-to-analog converter 38 changes the digital signal back to an analog signal and directs it along line 22 to signal input 12a on control unit 10 where such signal is amplified with its volume adjusted by volume control 13a by the musicians at the first instant location to a volume level at which they can perform their music and at the same time hear the musician(s) at the remote location over speaker 14 along with their own amplified music at approximately the same volume as, or at a higher volume than, their own music.

Figure 3:
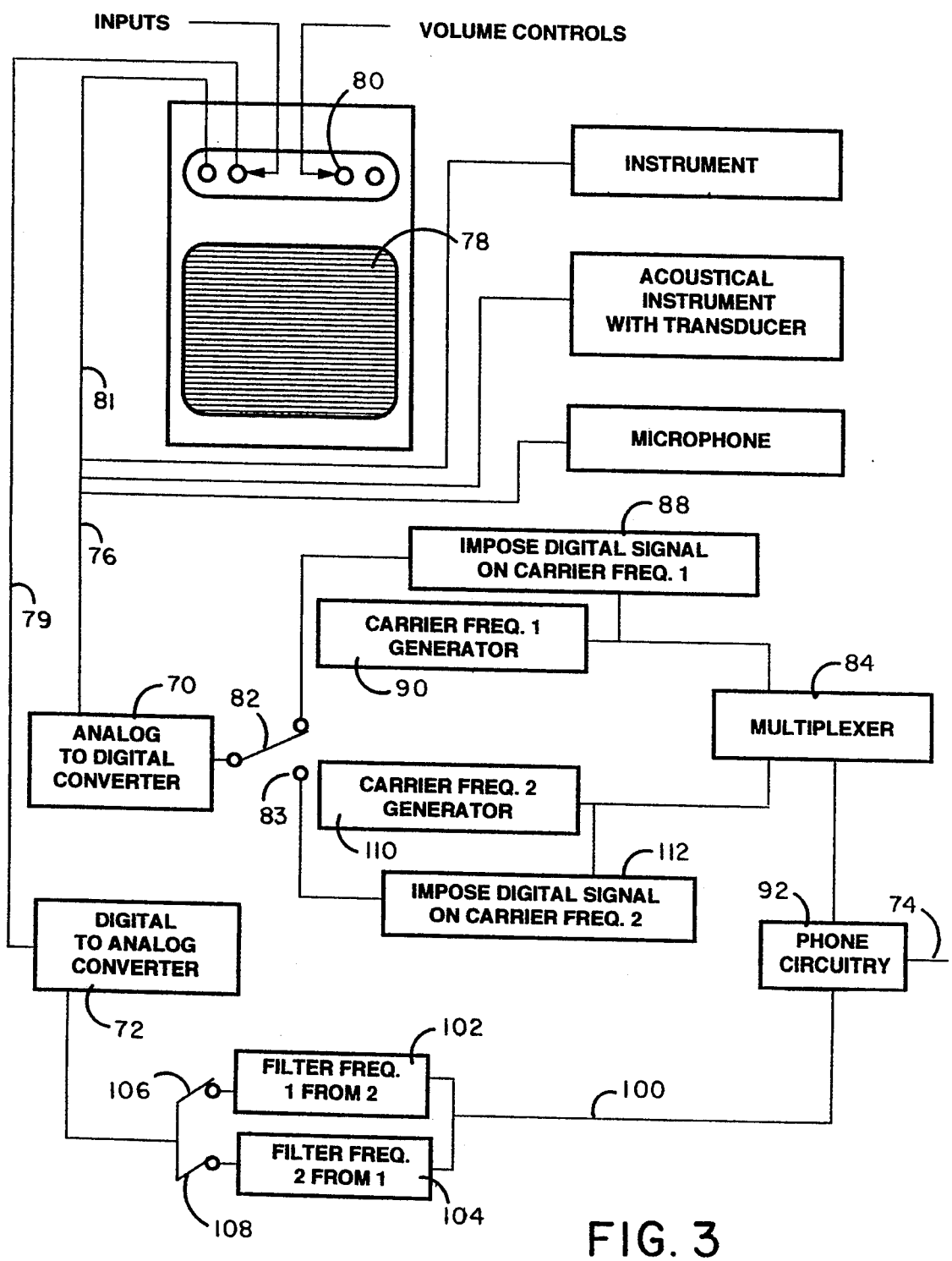
FIG. 3 illustrates a schematic diagram of the first instant location's frequency multiplexing system for transmission of digital signals to a second remote location.

FIG. 3 illustrates a further embodiment of the invention using frequency division multiplexing of two different signal frequencies such as one high frequency and the other a lower frequency band used as carriers, one frequency to be used selectively from each location. In this system similar pairs of analog-to-digital and digital-to-analog converters 70 and 72 as that in the embodiment of FIG. 1 are interconnected through the system. Output line 76 and input line 79 extend to amplifier/speaker 78 which also has volume controls 80 and 80a. Speaker 78 plays the music produced at the second remote location at the first instant location in combination with the music of the first instant location received through line 81. Volume controls 80 and 80a allow for balancing of the volume of the music from each location. The digitized first location signal coming from analog-to-digital converter 70 is directed by switch 82 to a selected one of two carrier frequency generators, and such signal as illustrated is imposed on a first carrier frequency generated from first carrier frequency generator 90 by digital signal imposer 88 before being multiplexed into telephone circuitry 92. When the instant location illustrated is to use the second carrier frequency because the remote location is sending its signal using the first carrier frequency, switch 82 is biased to its other contact 83, thereby directing the digitized signal to be imposed on the second carrier frequency produced by second carrier frequency generator 110 by digital signal imposer 112. The digital signal from the instant location having been imposed on the selected carrier frequency is then passed into multiplexer 84 and is multiplexed into telephone circuitry 92. Combined phone signals are directed by telephone circuitry 92 over line 100 to first and second frequency filters 102 and 104, each of which filters out a different one of the two carrier frequencies. Switches 106 and 108 bias open alternately and control which of the unfiltered first frequency or second frequency is passed to the digital-to-analog converter 72. In this embodiment switch 106 is closed, allowing the signal from the remote location to pass through telephone circuitry 92 down line 100 to first frequency filter 102 which filter filters out the first frequency signals used by the instant location but allows the second frequency signals from the remote location to pass therethrough. Switch 106 interconnects second frequency filter 102 to digital-to-analog converter 72 where the signal is converted back to an analog signal and is directed to amplifier/speaker 78. Thus the volume of the remote location is separate and controllable. The ability to hear simultaneously the sound of the remote location louder than the sound at the instant location is an important feature of this invention. The system of switches can be opened and closed alternately depending on the frequency selected at each location with each location being assigned a different frequency. Control units with three or more carrier frequencies can be used. This system in operation can also utilize two separate telephone lines, one for each location in order to reduce the amount of time-sharing or number frequency bands required on a single line which use will improve the signal quality. The system is also operable in conjunction with other transmission medium including a cable system such as used in cable television lines or any other interconnecting system between a first instant location and a second remote location.

Figure 4:
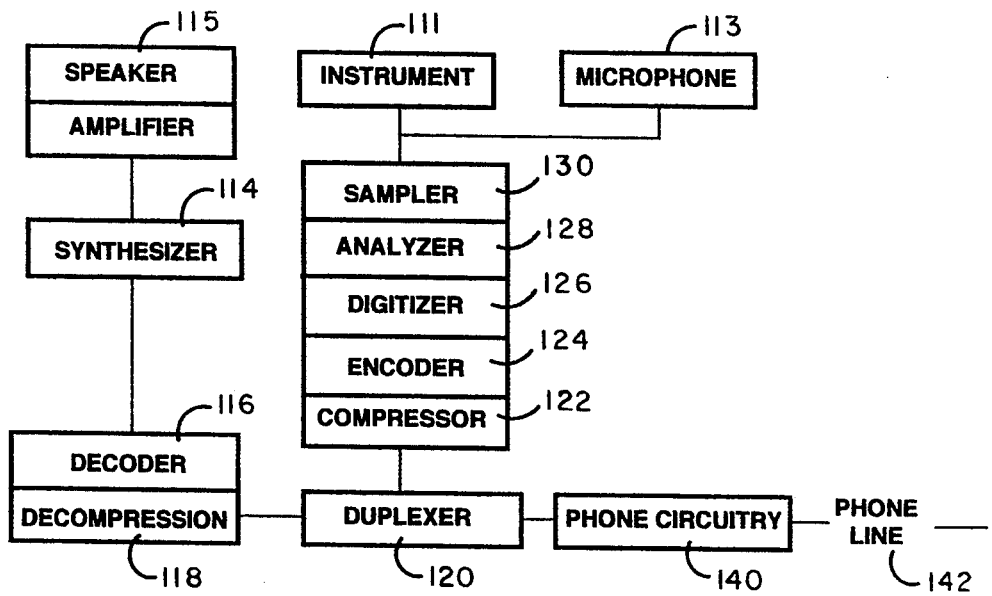
FIG. 4 illustrates a schematic diagram of a digital transmission system using a signal compressor and a synthesizer.

FIG. 4 illustrates a schematic diagram of an alternate time division multiplexing embodiment of the musicians telephone interface at the first instant location. As mentioned above, an identical system is provided at the second remote location. As seen in FIG. 4, instrument 111 and/or microphone 113 produce an analog signal which passes to a sampler 130 which periodically takes a sample segment of such analog signal and passes such samples to an analyzer 128 which directs such samples based on their frequency to a digitizer 126 which converts such analog signal samples to a digital signal which is transmitted by encoder 124. The encoded information can be compressed by compressor 122 to take up less bandwidth space or compressed into packets and passed to a duplexer 120 which multiplexes such signals through telephone circuitry 140 along telephone line 142 to a remote location where identical circuitry will receive such signal. When a signal is received from the remote location over telephone line 142, it passes through duplexer 120 where the outgoing signal is separated from the incoming signal which incoming signal is directed to a decompressor 118 which expands the digital signal back to its original state in the receiving direction and passes it to decoder 116 where the digital signal is reconverted to an analog signal. If the signal has been multiplexed over the lines with each musician and singer given his own channel whether by time division multiplexing or frequency division multiplexing, selected of such channels can be passed through synthesizer 114 for pitch and tone generation and then directed to amplifier/speaker 115 which broadcasts both the remote and instant location music at the instant location.

Figure 5:
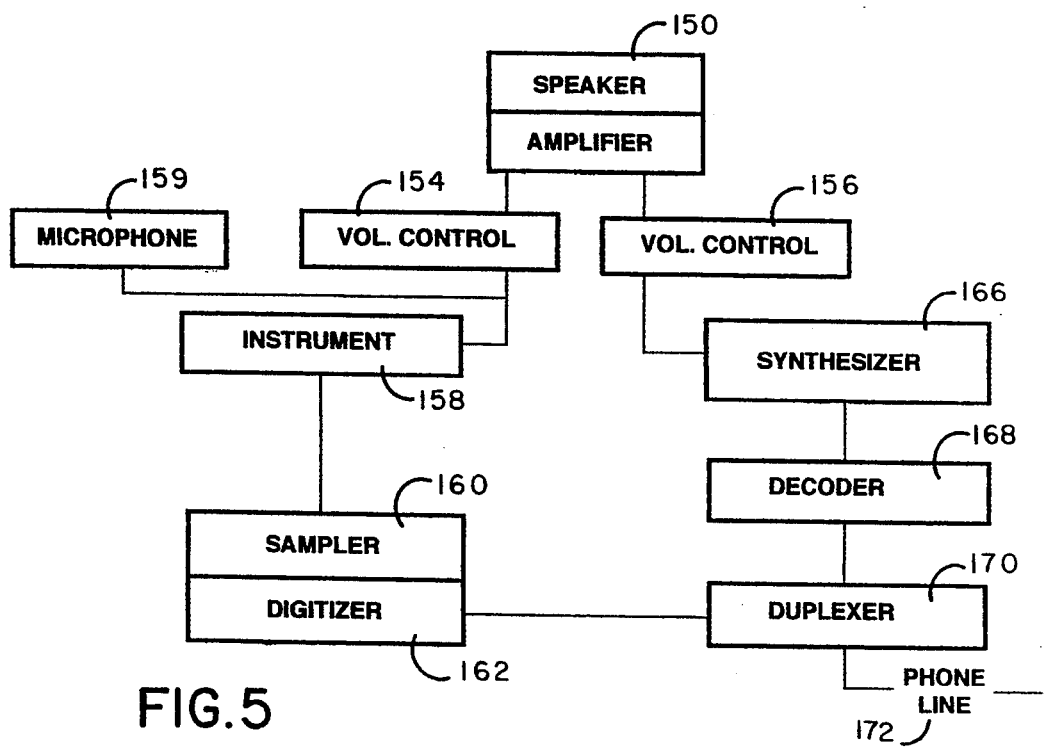
FIG. 5 illustrates a schematic diagram of an alternate digital transmission system.

FIG. 5 illustrates yet another embodiment similar to that of FIG. 4 but without a compression system where the analog signals from microphone 159 and/or instrument 158 pass the music at the first instant location through first volume control 154 to amplifier/speaker 150 where it is heard at the instant location. The signals from microphone 159 and instrument 158 are also passed through sampler 160 wherein the analog signals are sampled and are then converted to digital signals by digitizer 162 and passed through duplexer 170 to telephone line 172. At the same time the digital signals from the remote location pass over telephone line 172 through duplexer 170 to decoder 168 which converts the digital signals to analog signals some of which can be sampled and analyzed and passed through synthesizer 166 for pitch and tone generation and then to second volume control 156 to amplifier/speaker 150 where the remote location music can be heard at the desired volume at the instant location by adjustment of second volume control 156.

Figure 6:
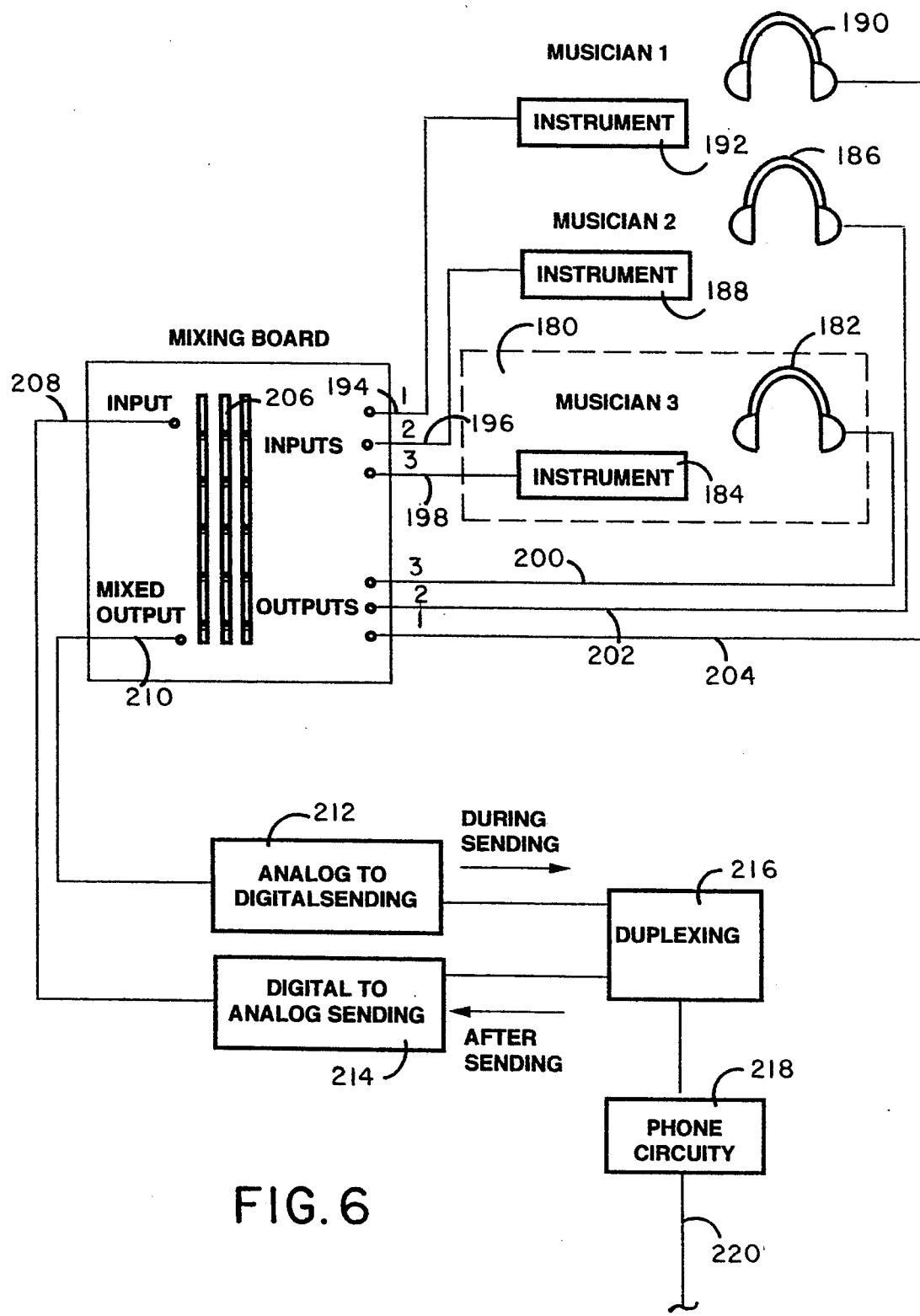
FIG. 6 illustrates a schematic diagram of a location using a mixing board and enclosure for a vocalist.

FIG. 6 illustrates an alternate embodiment where the third musician, being the vocalist, sings within room-like enclosure 180 into microphone 184, the signal of which passes along line 198 into input 3 of mixing board 206. Enclosure 180 helps prevent any unwanted sounds from reaching the vocalist's microphone from the first and second musicians playing instruments 192 and 188, respectively, interconnected by lines 194 and 196 to first and second inputs of mixing board 206. The musicians wear earphones 186 and 190, and the vocalist wears earphone 182 within room-like enclosure 180. The earphones are interconnected by lines 204, 202, and 200 respectively to the first, second and third outputs of mixing board 206. This configuration allows each musician/vocalist to control the volume of what he or she hears in his earphone, being a combination of the music from both the instant and remote locations. Mixing board 206 allows for the selected adjustment of volume of any of such signals based on the desire of each musician. Mixing board 206 has a mixed output combining the signal of the three musicians at the location shown in FIG. 6, passing such signal along line 210 to an analog-to-digital converter 212 from which the signal is duplexed through duplexing system 216, through phone circuitry 218, along line 220 to the remote location. The incoming signal from the remote location also passes along line 220, through phone circuitry 218, through duplexing system 216 where the received digital signal is then converted to an analog signal in the digital-to-analog converter 214 which directs the analog signal along line 208 to the mixing board input where such signal is amplified as desired and directed to first, second and third outputs. Also passing through the mixing board are the input signals from the musicians at that location which are also mixed with the incoming signal and passed out through first, second and third outputs so that the musicians at the instant location shown hear a combination of the signals both from the instant location and remote location in their earphones and can adjust the volume of each to a desired level.

Although the present invention has been described with reference to particular embodiments, it will be apparent to those skilled in the art that variations and modifications can be substituted therefor without departing from the principles and spirit of the invention.

I claim:

1. A telephone interface system to interconnect the musical audio output of two or more live musicians, one or more at a first instant location and the other(s) at a second remote location over interconnected communication lines, said system at each location comprising:

input means to receive said musical audio output at each of said locations and convert such audio output to analog signals;

an analog-to-digital converter to receive said analog signals and convert them to digital signals;

means to duplex said digital signals over said communication lines to said other location;

digital-to-analog converter to receive said digital signals from said other location and convert them to analog signals;

speaker means to broadcast said analog signals at each of said locations;

wherein said signals from said first and second locations are transmitted at different frequencies;

wherein said means to duplex said digital signals include a first and second frequency generator each producing a different carrier frequency, each digital signal imposed selectively on said carrier frequency with a different carrier frequency selected at each of said first and second locations;

first and second frequency filters to filter said first location's carrier frequency from said second location's carrier frequency and vice versa; and switch means to direct selected of said frequency filters to pass one of said carrier frequencies and digital signals from one of said locations while blocking the other carrier frequencies and digital signals from said other location.

2. The system of claim 1 further including:

means to compress said digitized signal at each location;

means to decompress said digitized signal at each location; and means to synthesize analog sound signals from said decompressed digital signals.

3. The system of claim 2 further including separate volume controls to control the volume of the music from both the instant and remote locations when played at the instant location.

4. The system of claim 3 wherein said analog signals are passed through a mixing board including said volume control for each musician heard at both the instant and remote locations.

5. The system of claim 4 wherein said speaker means includes earphones.

* * * * *